(12) United States Patent
Liu

(10) Patent No.: US 12,621,777 B2
(45) Date of Patent: May 5, 2026

(54) METHOD AND APPARATUS FOR REPORTING POWER HEADROOM, AND COMMUNICATION DEVICE

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 338 days.

(21) Appl. No.: 18/552,860

(22) PCT Filed: Mar. 31, 2021

(86) PCT No.: PCT/CN2021/084699
§ 371 (c)(1),
(2) Date: Sep. 27, 2023

(87) PCT Pub. No.: WO2022/205190
PCT Pub. Date: Oct. 6, 2022

(65) Prior Publication Data
US 2024/0188004 A1 Jun. 6, 2024

(51) Int. Cl.
*H04W 52/36* (2009.01)
*H04W 52/40* (2009.01)

(52) U.S. Cl.
CPC ......... *H04W 52/365* (2013.01); *H04W 52/40* (2013.01)

(58) Field of Classification Search
CPC ... H04W 52/365; H04W 52/40; H04W 24/08; H04W 72/21; H04L 5/0023; H04L 25/0226; H04L 5/0032; H04L 5/0044; H04L 5/0091; H04L 5/0048; H04L 5/0051; H04B 7/0697
(Continued)

(56) References Cited

U.S. PATENT DOCUMENTS

| | | | | |
|---|---|---|---|---|
| 2011/0292874 A1* | 12/2011 | Ho | ....................... | H04W 52/42 370/328 |
| 2012/0281568 A1* | 11/2012 | Ho | ..................... | H04W 52/365 370/252 |

(Continued)

FOREIGN PATENT DOCUMENTS

| | | |
|---|---|---|
| CN | 110536394 A | 12/2019 |
| WO | WO 2020/199956 A1 | 10/2020 |
| WO | WO 2020218900 A1 | 10/2020 |

OTHER PUBLICATIONS

First notice of examination opinion for CN 202180000910 date Jun. 30, 2025 (Year: 2025).*

(Continued)

*Primary Examiner* — Juan A Torres
(74) *Attorney, Agent, or Firm* — Finnegan, Henderson, Farabow, Garrett & Dunner, L.L.P.

(57) ABSTRACT

A method for reporting power headroom is performed by a user equipment (UE), and includes: obtaining one or more physical uplink shared channels (PUSCHs) transmitted towards a plurality of transmission and reception points (TRPs); selecting at least one reporting target TRP from the plurality of TRPs; obtaining at least one power headroom reporting (PHR) of at least one PUSCH of the at least one reporting target TRP; and selecting at least one target PHR from the at least one PHR and reporting the at least one target PHR.

20 Claims, 3 Drawing Sheets obtain a plurality of SRIs corresponding to the plurality of TRPs — 301 select the at least one reporting target TRP from the plurality of TRPs based on a ranking list of the plurality of SRIs — 302

(58) Field of Classification Search
USPC .......................................... 455/522, 517, 60
See application file for complete search history.

(56) References Cited

U.S. PATENT DOCUMENTS

| | | | | |
|---|---|---|---|---|
| 2018/0146438 A1* | 5/2018 | Yi | .......................... | H04W 52/24 |
| 2019/0281562 A1 | 9/2019 | Li et al. | | |
| 2020/0045651 A1* | 2/2020 | Cui | .......................... | H04L 5/001 |
| 2020/0100193 A1* | 3/2020 | Cheng | ................. | H04W 52/146 |
| 2020/0186304 A1 | 6/2020 | Khoshnevisan et al. | | |
| 2021/0045070 A1 | 2/2021 | Yi et al. | | |
| 2021/0051650 A1* | 2/2021 | Yi | .......................... | H04W 72/21 |
| 2022/0182948 A1* | 6/2022 | Raghavan | ........... | H04W 52/242 |
| 2022/0210748 A1* | 6/2022 | Huang | ................ | H04W 52/242 |
| 2022/0217644 A1* | 7/2022 | Kung | ................. | H04W 52/365 |
| 2022/0217654 A1* | 7/2022 | Kang | ................. | H04W 52/346 |
| 2022/0225369 A1* | 7/2022 | Park | ................. | H04W 72/0453 |
| 2022/0322245 A1* | 10/2022 | Park | .................... | H04W 52/365 |
| 2023/0046727 A1* | 2/2023 | Jung | ..................... | H04W 16/28 |
| 2023/0262608 A1* | 8/2023 | Gao | ..................... | H04W 52/08 |
| | | | | 455/522 |
| 2023/0276377 A1* | 8/2023 | Cirik | ................... | H04W 52/365 |
| | | | | 455/522 |
| 2023/0291442 A1* | 9/2023 | Davoli | ................ | H04B 7/0632 |

OTHER PUBLICATIONS

Notice of Reasons for Refusal issued by the Japanese Patent Office on Aug. 27, 2024, in corresponding Application No. JP 2023-558901, 5 pages.

International Search Report and Written Opinion of International Application No. PCT/CN2021/084699, dated Dec. 30, 2021, 20 pages.

Extended European Search Report issued in Application No. 21933854.8 dated Apr. 25, 2024, 9 pages.

* cited by examiner

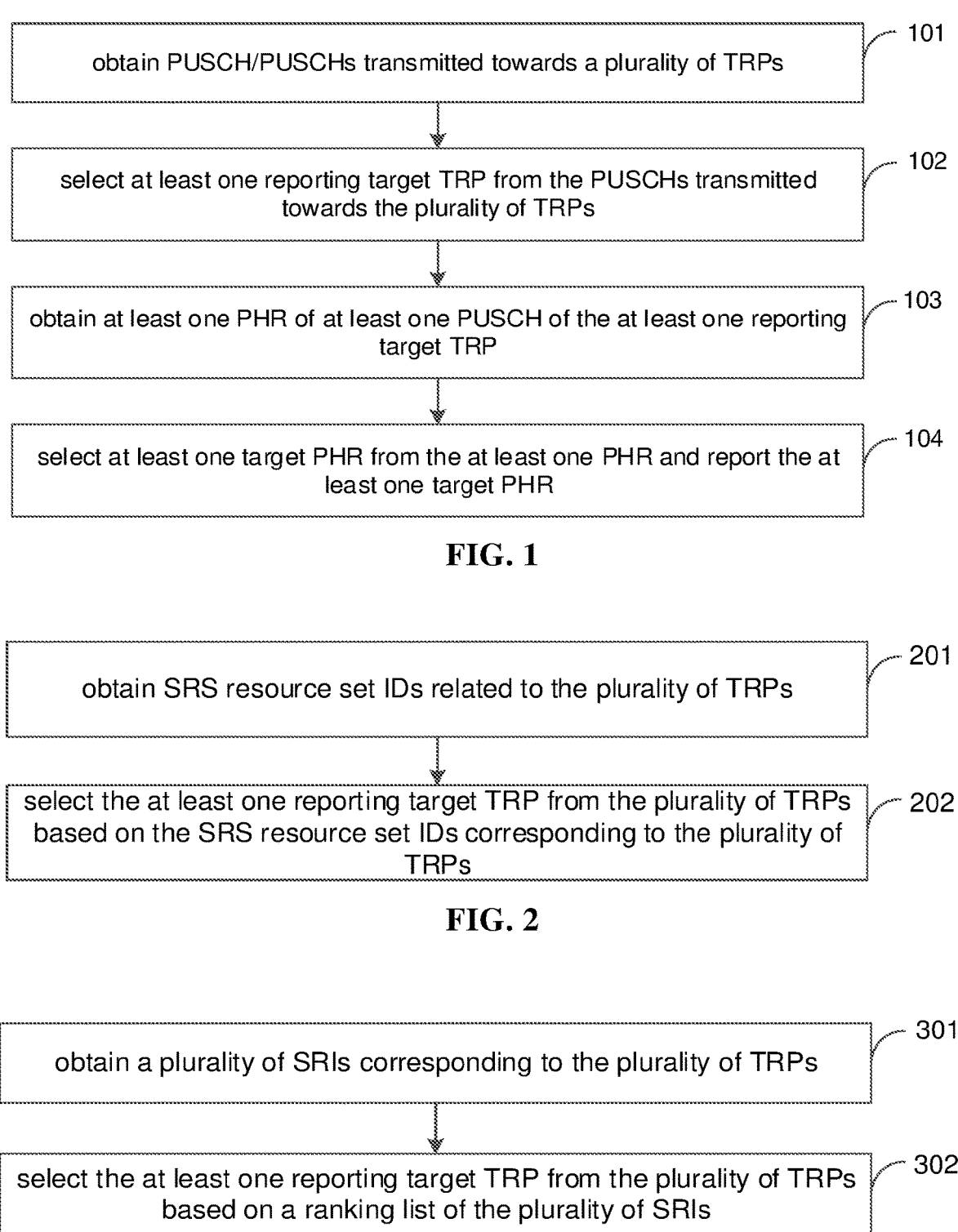

obtain PUSCH/PUSCHs transmitted towards a plurality of TRPs — 101 select at least one reporting target TRP from the PUSCHs transmitted towards the plurality of TRPs — 102 obtain at least one PHR of at least one PUSCH of the at least one reporting target TRP — 103 select at least one target PHR from the at least one PHR and report the at least one target PHR — 104

FIG. 1 obtain SRS resource set IDs related to the plurality of TRPs — 201 select the at least one reporting target TRP from the plurality of TRPs based on the SRS resource set IDs corresponding to the plurality of TRPs — 202

FIG. 2 obtain a plurality of SRIs corresponding to the plurality of TRPs — 301 select the at least one reporting target TRP from the plurality of TRPs based on a ranking list of the plurality of SRIs — 302

FIG. 3

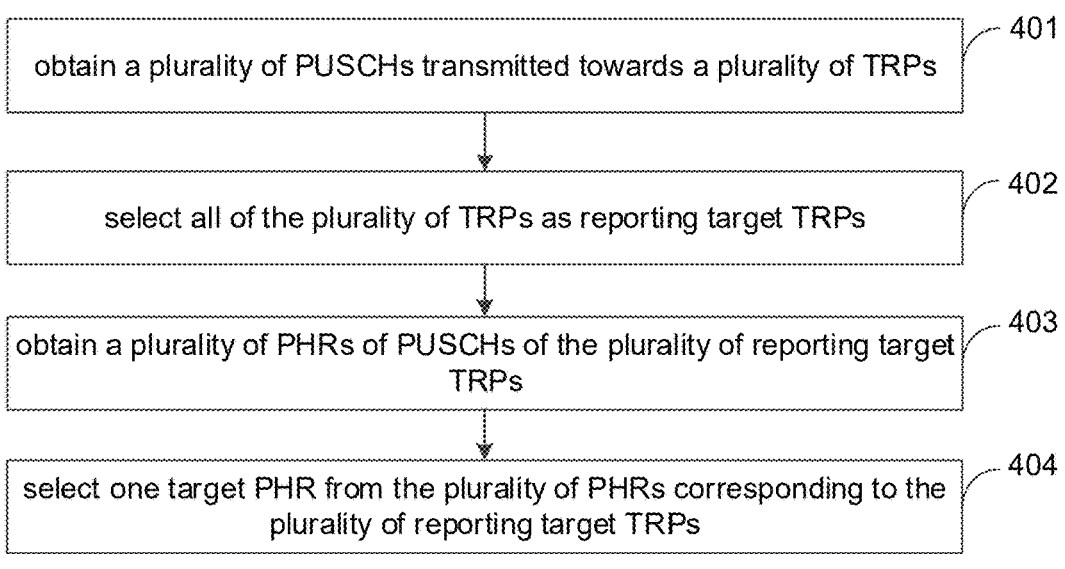

obtain a plurality of PUSCHs transmitted towards a plurality of TRPs   401 select all of the plurality of TRPs as reporting target TRPs   402 obtain a plurality of PHRs of PUSCHs of the plurality of reporting target TRPs   403 select one target PHR from the plurality of PHRs corresponding to the plurality of reporting target TRPs   404

FIG. 4

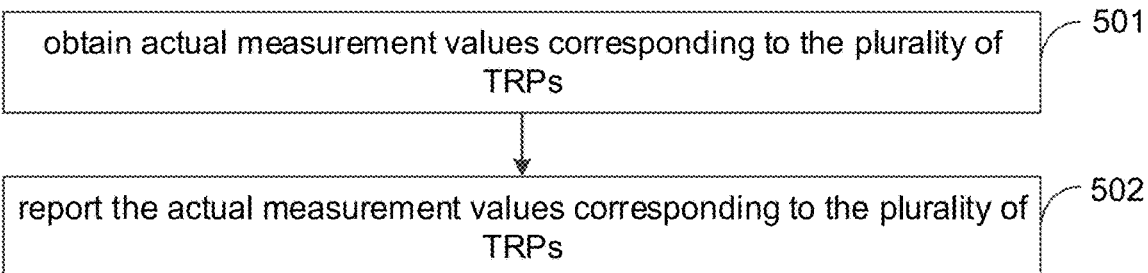

obtain actual measurement values corresponding to the plurality of TRPs   501 report the actual measurement values corresponding to the plurality of TRPs   502

FIG. 5

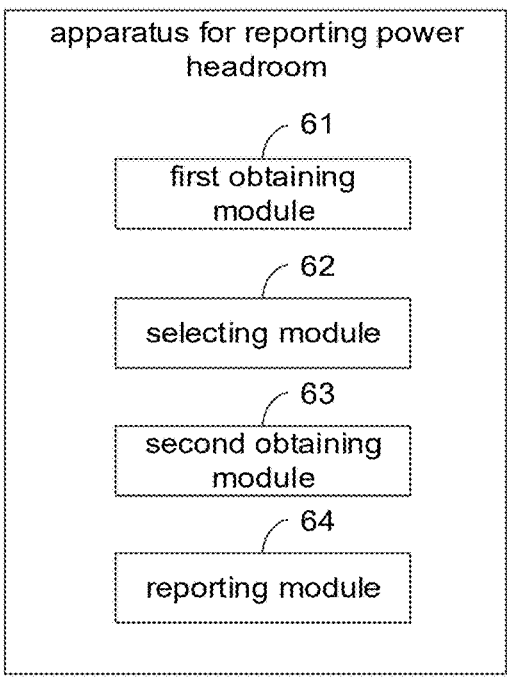

apparatus for reporting power headroom 61
first obtaining module 62
selecting module 63
second obtaining module 64
reporting module

FIG. 6

METHOD AND APPARATUS FOR REPORTING POWER HEADROOM, AND COMMUNICATION DEVICE

CROSS-REFERENCE TO RELATED APPLICATION

This application is a national phase of International Application No. PCT/CN2021/084699, filed on Mar. 31, 2021, the content of which is hereby incorporated by reference in its entirety.

TECHNICAL FIELD

The disclosure relates to a field of wireless communication technologies, in particular to a method for reporting power headroom, an apparatus for reporting power headroom and a communication device.

BACKGROUND

Multiple Transmission and Reception Points (TRPs)/PANELs are mainly applied to improve coverage at cell edges and provide a balanced service quality within a service area. The multiple TRPs/PANELs can collaborate in various ways to transmit data.

Power Headroom Reporting (PHR) reflects an available power of a terminal, i.e., power headroom, so that a network device can carry out power control based on the acquired PHR.

SUMMARY

According to a first aspect, a method for reporting power headroom, performed by a user equipment (UE), is provided. The method includes:

obtaining physical uplink shared channel (PUSCH)/PUSCHs transmitted towards a plurality of transmission and reception points (TRPs);

selecting at least one reporting target TRP from the PUSCHs transmitted towards the plurality of TRPs;

obtaining at least one power headroom reporting (PHR) of at least one PUSCH of the at least one reporting target TRP; and selecting at least one target PHR from the at least one PHR and reporting the at least one target PHR.

According to a second aspect, a communication device is provided. The communication device includes: a transceiver, a memory, and a processor connected to the transceiver and the memory, respectively. When computer executable instructions stored on the memory are executed by the processor, transmitting and receiving of wireless signals of the transceiver are controlled, and the method of the first aspect is performed.

According to a third aspect, a computer storage medium having computer-executable instructions stored thereon is provided. When the computer-executable instructions are executed by a processor, the method of the first aspect is performed.

BRIEF DESCRIPTION OF THE DRAWINGS

Example embodiments will be described in detail below with reference to the accompanying drawings, in which:

FIG. 1 is a flowchart illustrating a method for reporting power headroom according to embodiments of the disclosure.

FIG. 2 is a flowchart illustrating another method for reporting power headroom according to embodiments of the disclosure.

FIG. 3 is a flowchart illustrating another method for reporting power headroom according to embodiments of the disclosure.

FIG. 4 is a flowchart illustrating another method for reporting power headroom according to embodiments of the disclosure.

FIG. 5 is a flowchart illustrating another method for reporting power headroom according to embodiments of the disclosure.

FIG. 6 is a schematic diagram illustrating an apparatus for reporting power headroom according to embodiments of the disclosure.

DETAILED DESCRIPTION

Figure 7:
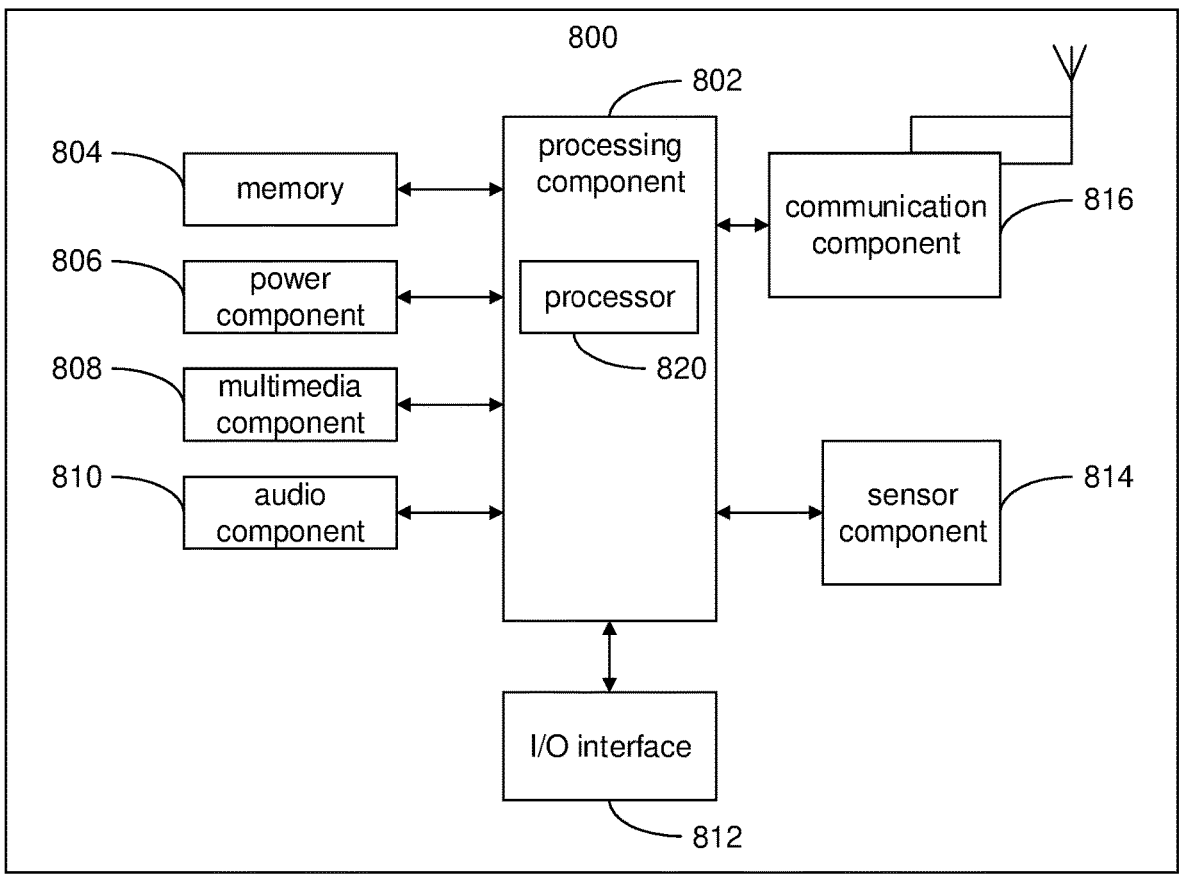
FIG. 7 is a block diagram illustrating a user equipment (UE) 800 according to embodiments of the disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the embodiments of the disclosure. The singular forms of "a" and "the" used in the disclosure and appended claims are also intended to include plural forms, unless the context clearly indicates other meanings. It is also understandable that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

The embodiments of the disclosure are described in detail below, and examples of the embodiments are illustrated in the accompanying drawings, in which the same or similar numbers represent the same or similar elements. The embodiments described below by reference to the accompanying drawings are examples and are intended to be used to explain the disclosure and are not to be construed as limiting the disclosure.

Multiple Transmission and Reception Points (TRPs)/PANELs are mainly applied to improve coverage at cell edges and provide a balanced service quality within a service area. The multiple TRPs/PANELs can collaborate in various ways to transmit data. From the perspective of network morphology, the network deployment that there are a large number of distributed access points together with a baseband centralization process will be more conducive to providing a balanced user experience rate, and significantly reduce a delay and a signaling overhead brought about by cross-area switching. Through collaboration between the multiple TRPs/PANELS, transmission/reception of channels can be performed for multiple beams at different angles, which can well overcome various occlusion/obstruction effects and guarantee a robustness of link connection, which is suitable for Ultra-reliable and Low Latency Communications (URLLC) services, thereby improving a transmission quality and satisfying reliability requirements.

Power Headroom Reporting (PHR) reflects an available power of a terminal, i.e., power headroom, so that a network device can carry out power control based on the acquired PHR. Therefore, in the control of uplink transmission, how a user-side device reports the PHR accurately is a technical problem that needs to be solved urgently.

A method for reporting power headroom, an apparatus for reporting power headroom and a communication device according to the disclosure will be described in detail below with reference to the accompanying drawings.

FIG. 1 is a flowchart illustrating a method for reporting power headroom according to embodiments of the disclosure. The method is applied to a user equipment (UE).

As illustrated in FIG. 1, the method includes the following.

At block 101, physical uplink shared channel (PUSCH)/PUSCHs transmitted towards a plurality of transmission and reception points (TRPs) are obtained.

The TRPs correspond to a serving cell or a neighboring cell of the UE.

In the embodiments, on the PUSCH/PUSCHs transmitted towards the plurality of TRPs, the power that each TRP transmits the PUSCH is controlled independently. Each measured power needs to be reported to a network device side, and thus there is a need to obtain the PUSCH/PUSCHs that are transmitted towards the plurality of TRPs.

At block 102, at least one reporting target TRP is selected from the PUSCHs transmitted towards the plurality of TRPs.

The method for selecting the at least one reporting target TRP from the PUSCH/PUSCHs transmitted towards the plurality of TRPs will be described in detail in subsequent embodiments.

At block 103, at least one power headroom reporting (PHR) of at least one PUSCH of the at least one reporting target TRP is obtained.

For determining the PHR, as a possible implementation, for each reporting target TRP, an actual transmit power of the reporting target TRP and a maximum transmit power Pcmax are obtained, and the maximum transmit power Pcmax is subtracted by the actual transmit power to obtain the corresponding PHR.

At block 104, at least one target PHR is selected from the at least one PHR and is reported.

With the method for reporting power headroom according to the embodiments of the disclosure, the power control processes of the PUSCH transmissions towards directions of different TRPs are performed independently, i.e., the powers of the PUSCH transmissions in different TRP directions may be different. Therefore, the at least one reporting target TRP needs to be selected from the PUSCHs transmitted towards the plurality of TRPs. Further, the corresponding PHR is determined based on the power of the PUSCH transmitted by the target TRP. Therefore, the enhanced PHR measurement and determination are realized in the scenario of the PUSCH transmissions in different TRP directions, and the PHR is reported to the network device, so that the network device can achieve accurate power control and rational allocation of network resources based on the reported PHR.

Based on the above embodiments, the at least one reporting target TRP is selected from the PUSCHs transmitted towards the plurality of TRPs. The method for selecting the at least one reporting target TRP from the PUSCHs transmitted towards the plurality of TRPs varies in different transmission scenarios, which will be described in detail below using different embodiments.

Based on the above embodiments, the embodiments provide an implementation as illustrated in FIG. 2 in which the above block 102 includes the following.

At block 201, sounding reference signal (SRS) resource set identifiers (IDs) related to the plurality of TRPs respectively are obtained.

At block 202, the at least one reporting target TRP is selected from the plurality of TRPs based on the SRS resource set IDs related to the plurality of TRPs.

In the embodiments, the SRS resource set IDs are configured to represent ranking information of the plurality of TRPs, and a TRP related to a largest SRS resource set ID or a smallest SRS resource set ID is selected, in a pre-defined manner or in a configured manner through a signaling from a network side device, as the reporting target TRP.

In a scenario, for the plurality of TRPs, the SRS resource set IDs related to the plurality of TRPs are ranked according to a preset ranking method. For example, the SRS resource set IDs are ranked in a descending order or in an ascending order. Further, the TRP related to the largest SRS resource set ID or the smallest SRS resource set ID among ranked SRS resource set IDs is selected according to a preset selecting method, as the reporting target TRP.

In another scenario, for the plurality of TRPs, the SRS resource set IDs related to the plurality of TRPs are ranked according to the preset ranking method. For example, the SRS resource set IDs are ranked in a descending order or in an ascending order. In the configured manner through the signaling from the network side device, for example, the manner of configuration through a Radio Resource Control (RRC) signaling, the TRP related to the largest SRS resource set ID or the smallest SRS resource set ID among ranked SRS resource set IDs is selected as the reporting target TRP.

With the method for reporting power headroom according to the embodiments of the disclosure, the TRP related to the largest SRS resource set ID or the smallest SRS resource set ID is selected by pre-defining or configuring through the signaling from the network side device as the reporting target TRP based on the ranking sequence of the SRS resource set IDs related to the plurality of TRPs. In this way, one target TRP is selected from the plurality of TRPs. The corresponding PHR is obtained by performing power measurement on the PUSCH transmission of the target TRP, and the corresponding PHR is reported to the network device. Therefore, PHR measurement and report of the PUSCHs based on the multi-TRP in different transmission modes are realized, and the enhanced PHR is obtained, so that the network device can achieve accurate power control and rational allocation of network resources based on the reported enhanced PHR.

Based on the above embodiments, the embodiment provides another implementation as illustrated in FIG. 3 in which the above block 102 includes the following.

At block 301, a plurality of SRS resource indicator (SRIs) corresponding to the plurality of TRPs are obtained.

At block 302, one reporting target TRP is selected from the plurality of TRPs based on a ranking list of the plurality of SRIs.

In a scenario, for the plurality of TRPs, the plurality of SRIs corresponding to the plurality of TRPs are ranked according to a preset ranking method. For example, the plurality of SRIs are ranked in an ascending order or descending order of index values of indication fields of the plurality of SRIs. The TRP corresponding to the SRI that is ranked first is selected as the reporting target TRP. For example, if the SRI corresponding to the TRP1 is ranked first (denoted by SPI1) and the SRI corresponding to the TRP2 is ranked last (denoted by SPI2), then the TRP1 corresponding to SRI1 that is ranked first in the sequence of SRI1 and SRI2 is selected as the reporting target TRP.

In another scenario, for the plurality of TRPs, the plurality of SRIs corresponding to the plurality of TRPs are ranked according to the preset ranking method. For example, the SRIs are ranked in an ascending order or a descending order of indication fields of the plurality of SRIs. The TRP corresponding to the SRI ranked last is selected as the reporting target TRP. For example, if the SRI corresponding to the TRP1 is ranked first (denoted by SRI1) and the SRI corresponding to the TRP2 is ranked last (denoted by SRI2), then the TRP2 corresponding to SRI 2 that is ranked last in the sequence of SRI 1 and SRI 2, is selected as the reporting target TRP.

A PHR is generated based on a transmit power of the PUSCH transmission of the TRP 2 and the PHR is reported to the network device.

With the method for reporting power headroom according to the embodiments of the disclosure, the plurality of SRIs corresponding to the plurality of TRPs are obtained, and the TRP corresponding to the SRI ranked first or last in the ranking list of the plurality of SRIs is selected from the plurality of TRPs as the reporting target TRP. Therefore, the PHR measurement and report of the PUSCHs based on the multi-TRP in different transmission modes are realized and the enhanced PHR is obtained, so that the network device can achieve accurate power control and rational allocation of network resources based on the reported enhanced PHR.

Based on the above embodiments, the embodiment provides another implementation as illustrated in FIG. 4. The method includes the following.

At block 401, PUSCH/PUSCHs transmitted towards a plurality of TRPs are obtained.

At block 402, all of the plurality of TRPs are determined as reporting target TRPs.

At block 403, a plurality of PHRs of PUSCHs of the plurality of reporting target TRPs are obtained.

In the embodiment, all of the acquired TRPs are determined as the reporting target TRPs, and the plurality of PHRs of the PUSCHs of the plurality of reporting target TRPs are obtained.

To determine the PHR, as a possible implementation, for each reporting target TRP, an actual transmit power of the reporting target TRP and a maximum transmit power Pcmax are obtained, and the maximum transmit power Pcmax is subtracted by the actual transmit power to obtain the PHR of the PUSCH of the reporting target TRP.

At block 404, one target PHR is selected from the plurality of PHRs corresponding to the plurality of reporting target TRPs.

In a first implementation of the embodiment, if at least one PHR of the plurality of PHRs is a negative value, it means that the transmit power of the PUSCH transmission of the reporting target TRP corresponding to each PHR which is the negative value cannot be further improved, and this transmit power has already reached a limit value of the transmit power of the UE. At least one PHR corresponding to the at least one negative value is determined as the target PHR and is reported, so that the network device can focus on the transmit powers of PUSCHs of the reporting target TRPs in time, to facilitate the network device to perform power management and control.

In a second implementation of the embodiment, if values of the plurality of PHRs are all negative, it means that the transmit powers of the PUSCH transmissions of the reporting target TRPs corresponding to all the PHRs cannot be further improved, and the transmit powers have already reached a limit value of the transmit power of the UE. The PHR with a largest absolute value is determined as the target PHR and is reported, so that the network device can focus on the transmit powers of PUSCHs of the reporting target TRPs in time, to facilitate the network device to perform the power management and control.

In a third implementation of the embodiment, if values of the plurality of PHRs are all positive, the PHR with a smallest absolute value is determined as the target PHR and is reported.

While selecting and reporting the target PHR from the plurality of PHRs corresponding to the plurality of target TRPs according to the above three implementations, as an implementation, a SRI ranking value or a SRS set ID related to the TRP corresponding to the target PHR may also be reported to the network device, so that the network device can determine an identifier of a UE that will be processed preferentially based on the SRI ranking value or the SRS Set ID related to the TRP corresponding to the target PHR.

In embodiments of the disclosure, the PHR measurement and report of the PUSCHs based on the multi-TRP in different transmission modes are realized, and the enhanced PHR is obtained, so that the network device can achieve accurate power control and rational allocation of network resources based on the reported enhanced PHR.

The above embodiments describe that the reported PHR is an estimated value of an actual power headroom. Based on the above embodiments, the embodiment provides an implementation to specifically illustrate reporting actual measurement values corresponding to the plurality of TRPs when transmitting the PUSCHs. As illustrated in FIG. 5, the method includes the following.

At block 501, actual measurement values corresponding to the plurality of TRPs are obtained.

The actual measurement value corresponding to the TRP is an actual power headroom measured when the corresponding TRP transmits the PUSCH.

At block 502, the actual measurement values corresponding to the plurality of TRPs are reported.

In an implementation of the embodiments of the disclosure, the actual measurement values corresponding to the plurality of TRPs are reported based on a pre-defined order or a ranking order based on SRS resource set IDs. That is, the actual measurement value of the power headroom is reported.

It is noteworthy that the pre-defined order may be a pre-defined order of reporting the actual measurement values corresponding to the plurality of TRPs as needed by those skilled in the art, which is not limited in the embodiments.

In another implementation of the embodiments of the disclosure, actual measurement value(s) corresponding to a part of the plurality of TRPs are reported as selected actual measurement value(s), i.e., these actual measurement value(s) of power headroom are reported to the network device, and differences of actual measurement values corresponding to the remaining part of the plurality of TRPs compared to the selected actual measurement value(s) are reported.

For example, the plurality of TRPs are TRP1, TRP2, and TRP3, and the corresponding actual measurement values of power headroom are PHR1, PHR2, and PHR3, respectively. The TRP1 reports the PHR1 to the network device, the TRP2 reports a difference between the PHR2 and the PHR1 to the network device, the TRP3 reports a difference between the PHR2 and the PHR3 to the network device or reports the difference between the PHR3 and a sum of the PHR2 and the PHR1 to the network device, to realize differential reporting, which improves the diversity of reporting and meets reporting demands of different scenarios.

In an implementation of the embodiments of the disclosure, while selecting and reporting the at least one target PHR from the at least one PHR, i.e., while reporting an estimation value of actual power headroom the TPR, the actual measurement value of power headroom corresponding to the TRP may also be reported simultaneously, so as to improve the accuracy of reporting power headroom by reporting these two kinds of power headroom values. Therefore, the network device may adjust the method for reporting the power headroom based on the estimation value of actual power headroom and the actual measurement value of power headroom, so as to improve the reliability of the reporting. Meanwhile, the network device can also carry out a weighted average operation on the estimation value of actual power headroom and the actual measurement value of power headroom to determine the final power headroom, so as to carry out power control correspondingly based on the power headroom and realize more effective allocation and utilization of network resources.

With the method for reporting power headroom according to the embodiments of the disclosure, the actual measurement values corresponding to the plurality of TRPs are obtained and reported, which enriches reporting methods to meet the reporting demands of different scenarios.

Based on the above embodiments, in the embodiments, for different PUSCH transmission modes based on the multi-TRP, while reporting the determined target PHR, in one case, if the PUSCH transmission is the PUSCH transmission controlled based on one Downlink Control Information (DCI), the target PHR is determined and reported to the network device using the method described in any method embodiments. In another case, if the PUSCH transmission is the PUSCH transmission controlled based on multiple DCIs, the target PHR is determined and reported to the network device using the method in the embodiments illustrated in FIG. 5. Therefore, measurement and reporting demands of power headroom in different scenarios are met, to better support dynamic scheduling of different transmission modes, and to realize accurate power control and more effective allocation and utilization of network resources.

In order to realize the above embodiments, the embodiment provides an apparatus for reporting power headroom, applied to a UE.

FIG. 6 is a schematic diagram illustrating an apparatus for reporting power headroom according to embodiments of the disclosure. As illustrated in FIG. 6, the apparatus includes: a first obtaining module 61, a selecting module 62, a second obtaining module 63 and a reporting module 64.

The first obtaining module 61 is configured to obtain PUSCH/PUSCHs transmitted towards a plurality of TRPs.

The selecting module 62 is configured to select at least one reporting target TRP from the PUSCHs transmitted towards the plurality of TRPs.

The second obtaining module 63 is configured to obtain at least one PHR of at least one PUSCH of the at least one reporting target TRP.

The reporting module 64 is configured to select at least one target PHR from the at least one PHR and report the at least one target PHR.

In an implementation of the embodiments of the disclosure, the selecting module 62 is further configured to: obtain SRS resource set IDs related to the plurality of TRPs respectively; and select the at least one reporting target TRP from the plurality of TRPs based on the SRS resource set IDs related to the plurality of TRPs.

In an implementation of the embodiments of the disclosure, the SRS resource set IDs are configured to represent ranking information, and a TRP related to a largest SRS resource set ID or a smallest SRS resource set ID is selected, in a pre-defined manner or in a configured manner through a signaling from a network side device, as the reporting target TRP.

In an implementation of the embodiments of the disclosure, the selecting module 62 is further configured to: obtain a plurality of SRIs corresponding to the plurality of TRPs; and select the at least one reporting target TRP from the plurality of TRPs based on a ranking list of the plurality of SRIs.

In an implementation of the embodiments of the disclosure, a TRP corresponding to a first SRI or a last SRI in the ranking list is determined as the reporting target TRP.

In an implementation of the embodiments of the disclosure, the selecting module 62 is further configured to: select all of the plurality of TRPs as reporting target TRPs.

In an implementation of the embodiments of the disclosure, the reporting module 64 is further configured to: select one target PHR from a plurality of PHRs corresponding to the plurality of reporting target TRPs and report the target PHR.

In an implementation of the embodiments of the disclosure, the reporting module 64 is further configured to: in response to at least one of the plurality of PHRs being a negative value, determine at least one PHR corresponding to the at least one negative value as the target PHR and report the target PHR.

In an implementation of the embodiments of the disclosure, the reporting module 64 is further configured to: in response to values of the plurality of PHRs all being negative, determine a PHR with a largest absolute value as the target PHR and report the target PHR.

In an implementation of the embodiments of the disclosure, the reporting module 64 is further configured to: in response to values of the plurality of PHRs all being positive, determine a PHR with a smallest absolute value as the target PHR and report the target PHR.

In an implementation of the embodiments of the disclosure, the reporting module 64 is further configured to: report a SRI ranking value or a SRS set ID related to a TRP corresponding to the target PHR.

In an implementation of the embodiments of the disclosure, the apparatus further includes a computing module, configured to: obtain an actual transmit power of a TRP; obtain a maximum transmit power Pcmax; and calculate the PHR based on the actual transmit power and the maximum transmit power Pcmax.

In an implementation of the embodiments of the disclosure, the second obtaining module 63 is further configured to: obtain actual measurement values corresponding to the plurality of TRPs.

The reporting module 64 is further configured to: report the actual measurement values corresponding to the plurality of TRPs.

In an implementation of the embodiments of the disclosure, the reporting module 64 is further configured to: report the actual measurement values corresponding to the plurality of TRPs based on a pre-defined order or a ranking order based on SRS set IDs.

In an implementation of the embodiment of the disclosure, the reporting module 64 is further configured to: report at least one of the actual measurement values corresponding to the plurality of TRPs as a selected actual measurement value, and report differences of remaining actual measurement values corresponding to the plurality of TRPs compared to the selected actual measurement value.

It is noteworthy that the foregoing explanatory description of the method embodiments is also applicable to the apparatus of the embodiments, which is based on the same principle and will not be repeated in the embodiment.

With the apparatus for reporting power headroom according to the embodiments of the disclosure, the power control processes of the PUSCH transmissions towards directions of different TRPs are performed independently, i.e., the powers of the PUSCH transmissions in different TRP directions may be different. Therefore, the at least one reporting target TRP needs to be selected from the PUSCHs transmitted towards the plurality of TRPs. Further, the corresponding PHR is determined based on the power of the PUSCH transmitted by the target TRP. Therefore, the enhanced PHR measurement and determination are realized in the scenario of the PUSCH transmissions in different TRP directions, and the PHR is reported to the network device, so that the network device can achieve accurate power control and rational allocation of network resources based on the reported PHR.

In order to realize the above embodiments, the disclosure also provides a communication device.

The embodiments of the disclosure provide a communication device, including a processor, a transceiver, a memory, and executable programs stored on the memory and runnable by the processor. When the executable programs are executed by the processor, the method described in the method embodiments is implemented.

The communication device may be the UE as described above.

The processor may include various types of storage mediums. The storage mediums are non-transitory computer storage mediums capable of continuing to memorize information stored thereon after the communication device is powered down.

The processor may be connected to the memory via a bus or the like for reading executable programs stored on the memory, e.g., at least one of FIGS. 1 to 5.

In order to realize the above embodiments, the disclosure also provides a computer storage medium.

The embodiments of the disclosure provide a computer storage medium having executable programs stored thereon. When the executable programs are executed by a processor, the above method, e.g., at least one of FIGS. 1 to 5, is implemented.

FIG. 7 is a block diagram illustrating a UE 800 according to embodiments of the disclosure. For example, the UE 800 may be a mobile phone, a computer, a digital broadcasting UE, a message transceiver device, a game console, a tablet device, a medical device, a fitness device and a personal digital assistant.

As illustrated in FIG. 7, the UE 800 may include at least one of the following components: a processing component

802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include at least one processor 820 to perform all or part of the steps in the above described method. Moreover, the processing component 802 may include at least one module which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any application or method operated on the UE 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 806 provides power to various components of the UE 800.

The power component 806 may include a power management system, at least one power source, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one sensor to sense touches, swipes, and gestures on the touch panel. The touch sensor may not only sense a boundary of a touch or swipe action, but also sense a period of time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes at least one sensor to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G or 3G, or a combination thereof. In an example embodiment, the communication component 816 receives a broadcast signal or broadcast associated information from an external broadcast management system via a broadcast channel. In an example embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the example embodiment, the UE 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the example embodiments, there is also provided a non-transitory computer readable storage medium including instructions, such as the memory 804, executable by the processor 820 in the UE 800, for performing the above method. For example, the non-transitory computer-readable storage medium may be a ROM, a Random Access Memory (RAM), a CD-ROM, a magnetic tape, a floppy disc, and an optical data storage device.

The technical solutions according to the embodiments of the disclosure may include the following beneficial effects.

The configuration information related to the PUSCHs transmitted towards the plurality of TRPs is obtained. The at least one reporting target TRP is selected from the PUSCHs transmitted towards the plurality of TRPs. The at least one PHR of at least one PUSCH of the at least one reporting target TRP is obtained. The at least one target PHR is selected from the at least one PHR and the at least one target PHR is reported. In the disclosure, based on the PUSCH transmissions in the directions of the multi-TRP, the PUSCH transmission towards the target TRP is selected, to determine a corresponding enhanced PHR, which improves the accuracy of the PHR, thereby realizing accurate power control.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for reporting power headroom, performed by a user equipment (UE), comprising:

obtaining one or more physical uplink shared channels (PUSCHs) transmitted towards a plurality of transmission and reception points (TRPs);

selecting at least one reporting target TRP from the plurality of TRPs;

obtaining at least one power headroom reporting (PHR) of at least one PUSCH of the at least one reporting target TRP; and selecting at least one target PHR from the at least one PHR and reporting the at least one target PHR;

wherein selecting the at least one reporting target TRP from the plurality of TRPs comprises one of:

obtaining sounding reference signal (SRS) resource set identifiers (IDs) related to the plurality of TRPs respectively; and selecting one reporting target TRP from the plurality of TRPs based on the SRS resource set IDs related to the plurality of TRPs; or obtaining a plurality of SRS resource indicator (SRIs) corresponding to the plurality of TRPs; and selecting one reporting target TRP from the plurality of TRPs based on a ranking list of the plurality of SRIs.

2. The method of claim 1, wherein each SRS resource set ID is configured to represent ranking information, and a TRP related to a largest SRS resource set ID or a smallest SRS resource set ID is selected in a pre-defined manner or in a configured manner through a signaling from a network side device, as the reporting target TRP.

3. The method of claim 2, wherein the signaling from the network side device is a radio resource control (RRC) signaling.

4. The method of claim 2, wherein the SRS resource set IDs related to the plurality of TRPs are ranked in an ascending order or a descending order.

5. The method of claim 1, wherein a TRP corresponding to a first SRI or a last SRI in the ranking list is determined as the reporting target TRP.

6. The method of claim 5, wherein the ranking list of the plurality of SRIs comprises an ascending order of SRIs or a descending order of SRIs, the first SRI is ranked first of the ascending order of SRIs or the descending order of SRIs, and the last SRI is ranked last of the ascending order of SRIs or the descending order of SRIs.

7. The method of claim 1, wherein selecting the at least one reporting target TRP from the plurality of TRPs comprises:

selecting all of the plurality of TRPs as reporting target TRPs;

wherein selecting the at least one target PHR from the at least one PHR and reporting the at least one target PHR comprises: selecting one target PHR from a plurality of PHRs corresponding to the reporting target TRPs and reporting the target PHR; and wherein the method further comprises: reporting a sounding reference signal (SRS) resource indicator (SRI) ranking value or a SRS resource set identifier (ID) related to the TRP corresponding to the target PHR.

8. The method of claim 7, wherein selecting one target PHR from the plurality of PHRs corresponding to the reporting target TRPs and reporting the target PHR comprises:

determining one of at least one PHR corresponding to the at least one negative value as the target PHR and reporting the target PHR, wherein at least one of the plurality of PHRs is a negative value.

9. The method of claim 7, wherein selecting one target PHR from the plurality of PHRs corresponding to the reporting target TRPs and reporting the target PHR comprises:

determining a PHR with a largest absolute value as the target PHR and reporting the target PHR, wherein values of the plurality of PHRs are all negative.

10. The method of claim 7, wherein selecting one target PHR from the plurality of PHRs corresponding to the reporting target TRPs and reporting the target PHR comprises:

determining a PHR with a smallest absolute value as the target PHR and reporting the target PHR, wherein values of the plurality of PHRs are all positive.

11. The method of claim 1, wherein the PHR is obtained by:

obtaining an actual transmit power of a corresponding TRP;

obtaining a maximum transmit power; and obtaining the PHR based on the actual transmit power and the maximum transmit power.

12. The method of claim 1, further comprising:

obtaining actual PHR measurement values corresponding to the plurality of TRPs; and reporting the actual PHR measurement values corresponding to the plurality of TRPs.

13. The method of claim 12, wherein reporting the actual PHR measurement values corresponding to the plurality of TRPs comprises:

reporting the actual PHR measurement values corresponding to the plurality of TRPs based on a pre-defined order or a ranking order based on sounding reference signal (SRS) resource set identifiers (IDs).

14. The method of claim 12, wherein reporting the actual PHR measurement values corresponding to the plurality of TRPs comprises:

reporting at least one actual PHR measurement value corresponding to a part of the plurality of TRPs as a selected actual PHR measurement value, and reporting differences of actual PHR measurement values, corresponding to a remaining part of the plurality of TRPs, compared to the at least one actual PHR measurement value.

15. The method of claim 12, wherein the PUSCH transmission is controlled based on multi-downlink control information (DCI).

16. The method of claim 1, wherein respective power for transmitting the PUSCH towards the plurality of TRPs are separately controlled.

17. The method of claim 1, wherein the PUSCH transmission is controlled based on single downlink control information (DCI).

18. A user equipment (UE), comprising:

a transceiver, a memory, and a processor connected to the transceiver and the memory respectively, wherein the processor is configured to:

obtain one or more physical uplink shared channels (PUSCHs) transmitted towards a plurality of transmission and reception points (TRPs);

select at least one reporting target TRP from the plurality of TRPs;

obtain at least one power headroom reporting (PHR) of at least one PUSCH of the at least one reporting target TRP; and select at least one target PHR from the at least one PHR and report the at least one target PHR;

wherein the processor is further configured to select at least one reporting target TRP from the plurality of TRPs by one of:

obtaining sounding reference signal (SRS) resource set identifiers (IDs) related to the plurality of TRPs respectively; and selecting one reporting target TRP from the plurality of TRPs based on the SRS resource set IDs related to the plurality of TRPs; or obtaining a plurality of SRS resource indicator (SRIs) corresponding to the plurality of TRPs; and selecting one reporting target TRP from the plurality of TRPs based on a ranking list of the plurality of SRIs.

19. The UE of claim 18, wherein each SRS resource set ID is configured to represent ranking information, and a TRP related to a largest SRS resource set ID or a smallest SRS resource set ID is selected in a pre-defined manner or in a configured manner through a signaling from a network side device, as the reporting target TRP.

20. A non-transitory computer-readable storage medium having stored thereon computer-executable instructions that, when executed by a processor of a user equipment (UE), cause the UE to perform:

obtaining one or more physical uplink shared channels (PUSCHs) transmitted towards a plurality of transmission and reception points (TRPs);

selecting at least one reporting target TRP from the plurality of TRPs;

obtaining at least one power headroom reporting (PHR) of at least one PUSCH of the at least one reporting target TRP; and selecting at least one target PHR from the at least one PHR and reporting the at least one target PHR;

wherein the processor is further configured to perform one of:

obtaining sounding reference signal (SRS) resource set identifiers (IDs) related to the plurality of TRPs respectively; and selecting one reporting target TRP from the plurality of TRPs based on the SRS resource set IDs related to the plurality of TRPs; or obtaining a plurality of SRS resource indicator (SRIs) corresponding to the plurality of TRPs; and selecting one reporting target TRP from the plurality of TRPs based on a ranking list of the plurality of SRIs.

* * * * *